United States Patent [19]
Beabout

[11] Patent Number: 5,511,309
[45] Date of Patent: Apr. 30, 1996

[54] METHOD OF MANUFACTURING A TURBINE AIRFOIL WITH ENHANCED COOLING

[75] Inventor: Brian K. Beabout, Coventry, Conn.

[73] Assignee: United Technologies Corporation, Hartford, Conn.

[21] Appl. No.: 382,823

[22] Filed: Feb. 3, 1995

Related U.S. Application Data

[63] Continuation of Ser. No. 158,135, Nov. 24, 1993, abandoned.

[51] Int. Cl.⁶ .................................................. B23P 15/00
[52] U.S. Cl. ............................. 29/889.72; 29/889.721; 29/889.722
[58] Field of Search .................... 29/889.721, 889.72, 29/889.722; 415/115, 116; 416/97 R

[56] References Cited

U.S. PATENT DOCUMENTS

| | | | |
|---|---|---|---|
| 3,848,307 | 11/1974 | Kydd | 29/889.721 |
| 4,278,400 | 7/1981 | Yamarik et al. | 416/97 R |
| 4,292,008 | 9/1981 | Grosjean et al. | 415/115 |
| 4,311,433 | 1/1982 | Bratton et al. | 29/889.721 |
| 4,456,428 | 6/1984 | Cuvillier | 415/115 |
| 4,474,532 | 10/1984 | Pazder | 415/115 |
| 4,761,116 | 8/1988 | Braddy et al. | 416/97 R |
| 4,775,296 | 10/1988 | Schwarzmann et al. | 415/115 |
| 4,883,404 | 11/1989 | Sherman | 29/889.721 |
| 5,243,759 | 9/1993 | Brown et al. | 29/889.721 |
| 5,403,156 | 4/1995 | Arness et al. | 29/889.721 |

FOREIGN PATENT DOCUMENTS

| | | | |
|---|---|---|---|
| 205301 | 9/1986 | Japan | 416/97 R |

Primary Examiner—Irene Cuda
Attorney, Agent, or Firm—Marina F. Cunningham

[57] ABSTRACT

Cooling of a turbine airfoil such as a turbine stator vane in a gas turbine engine is enhanced by the provision of additional cooling air through a secondary air inlet communicating with a medial portion of an internal, serpentine cooling air passage.

4 Claims, 2 Drawing Sheets

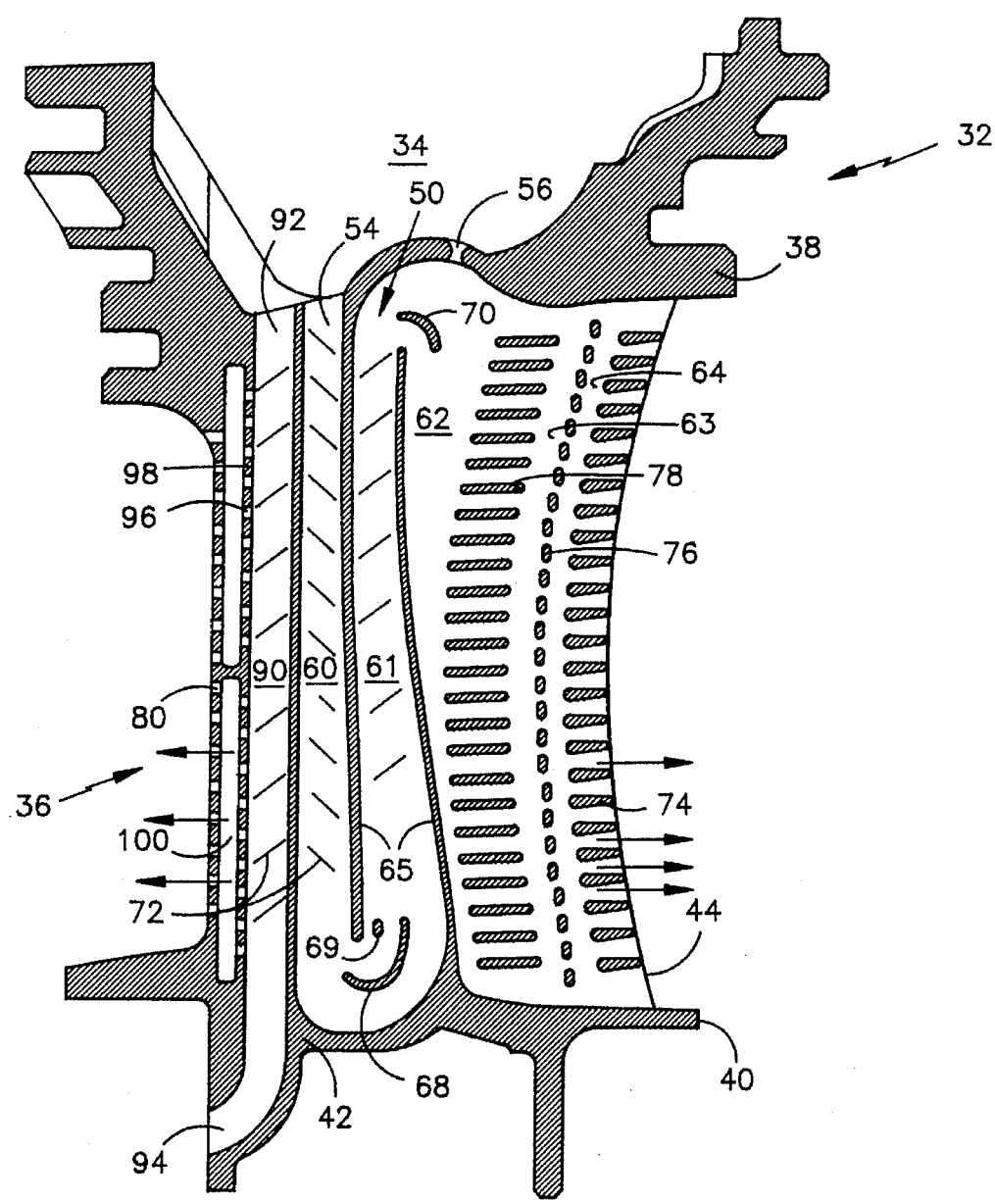
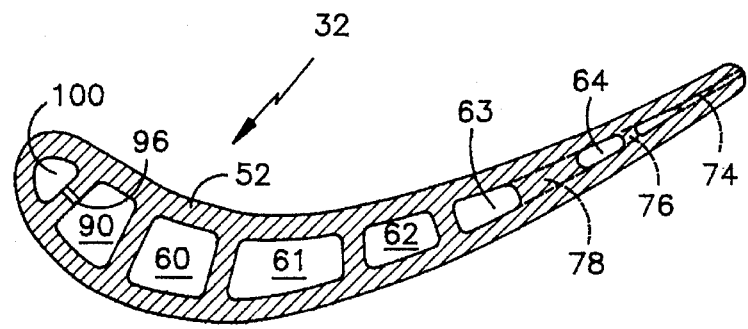

5,511,309

METHOD OF MANUFACTURING A TURBINE AIRFOIL WITH ENHANCED COOLING

This is a request for filing a continuation application under 37 CFR 1.62 of prior application Ser. No. 08/158,135 filed on Nov. 24, 1993, abandoned.

TECHNICAL FIELD

This invention relates to gas turbine engines and more particularly to the cooling of turbine airfoils therefor.

BACKGROUND ART

The turbine section of a gas turbine engine is subjected to extremely high temperatures. The temperature of hot gases entering the turbine from the combustor is generally well above the melting point temperatures of the alloys from which turbine rotor blades and stator vanes are fabricated. Since both vanes and blades are subjected to such high temperatures, they must be cooled to maintain their structural integrity.

The turbine vanes and blades are cooled by air bled from the engine's compressor, bypassing the combustor. It will be understood that any compressor bleed air for such cooling will be unavailable to support combustion in the combustor. Thus, to minimize any sacrifice in engine performance due to inadequate airflow to support combustion, any scheme for cooling turbine blades and vanes must optimize the utilization of compressor bleed cooling air.

Generally, turbine blade and vane cooling is accomplished by external film cooling, and internal air impingement and convection cooling, or a combination of both. With air impingement, compressor bleed air is channeled to the inside of an airfoil and directed onto the inside walls of the airfoil. The air then exits the airfoil through a set of film holes provided within the airfoil walls. Air impingement is an effective method for cooling blades.

In convection cooling, compressor bleed air flows through typically serpentine passages in the blades and vanes, continuously removing heat therefrom. Compressor bleed air enters the passages through an inlet disposed generally in a leading portion of the airfoil, which discharges into the serpentine passage. The passage also includes fins or ridges (also known as "trip strips") in a wall thereof, which facilitate improved convection cooling of the airfoil walls. The precise dimensions and locations of these trip strips can control the amount of air flow through the passage and also, at least in part, determine the cooling efficiency of the overall serpentine structure.

Turning vanes may be employed to channel air flow around the bends of the serpentine passages which terminate in a series of film holes located near the trailing edge of the blade or vane, through which some of the cooling air is discharged.

It will be appreciated that as the cooling air flows through the serpentine passage, it loses pressure. By the time the air flow reaches the trailing edge, if the pressure is too low, hot combustion gases outside the blade or vane may enter through the blade or vane film holes therein. This would, of course, hinder the cooling of the airfoil and may cause burning of the airfoil walls. Thus, there is an acute need to maintain a higher level of pressure within the airfoil cooling passages than on the outside of the airfoil.

The conventional method of fabricating the airfoil blade or vane with serpentine cooling passages is to cast the part and then to precisely shape the part through extensive machining. In the casting process, a mold and a core are first fabricated, the core defining the shape of the cooling air passages in the interior of the airfoil. The core is held in place by a core support rod attached to the core and protruding through the airfoil wall.

After the casting process is completed, the core is dissolved by application of a chemical solution, the voids in the airfoil left by dissolving the core forming the serpentine cooling passages in the airfoil. The hole within the airfoil casting formed by removal of the core support rod is then closed and the cast part is machined into its final shape.

Although the casting process yields a high quality product, the process itself is costly and time consuming. The fabrication of the mold and core are especially complex due to the intricate shapes of the cooling passages. Thus, retooling to correct airfoil overheating problems discovered during the testing may be expensive and impractical, if not economically prohibitive.

Presently, it is not conveniently possible to adjust the amount of air flow through airfoil cooling passages without the extreme costs and expenditures of time required in retooling to recast cooling passage with adjustments in the geometrics thereof.

Another problem that arises with serpentine cooling passages, is that once the compressor bleed air enters the serpentine passage, it gets progressively hotter within the passage as it removes heat from the airfoil and may not have adequate cooling capacity to effectively cool the trailing edge of the airfoil.

It will be appreciated that any solutions to the problems of cooling current turbine blades and vanes outlined hereinabove, should not come at the expense of added weight, which even in minute quantities thereof per airfoil, can significantly detract from engine performance.

DISCLOSURE OF THE INVENTION

It is therefore, an object of the present invention to provide a turbine airfoil with enhanced cooling.

It is a further object of the present invention to be able to adjust the air flow and pressure through a cooling passage within an airfoil, depending on the particular cooling needs of this airfoil after the part is cast, and without significant retooling.

It is a further object of the present invention to enhance the cooling of turbine airfoils without any corresponding increase in the weight thereof.

It is a further object of the present invention to enhance the efficiency with which compressor cooling is used to cool turbine airfoils.

It is a further object of the present invention to maintain cooling air pressures within the serpentine cooling passage in turbine airfoils, higher than combustor gas pressures outside the airfoil.

According to the present invention, a gas turbine engine airfoil including a serpentine cooling passage, wherein cooling air enters the airfoil through a primary inlet disposed at a leading portion of the airfoil, flows through the passage thereby cooling the airfoil, and exits at a trailing edge of the airfoil, also includes a secondary cooling air inlet at a specific location at a medial portion of the passage, allowing additional cooling air to enter the serpentine passage, midstream, to provide additional cooling capacity and pressure to the midsection and trailing portion of the airfoil.

Adjustment of the amount of air flow through the serpentine passage Without refabricating the casting mold and core becomes possible by adjustment in the size of the secondary inlet. The inlet size can be enlarged by drilling or partially closed off by partial filling. Such processes of adjusting inlet size is significantly less time consuming than refabrication of the casting mold and core. By selectively locating the secondary inlet, flow there-through can facilitate the turning of the air flow within the serpentine passage, thereby eliminating the need for turning vanes and the excess weight associated therewith. Furthermore, air flow through the secondary inlet enhances pressure of the serpentine passage, thereby reducing the risk of the backflow into the cooling passage of hot combustor gases from the exterior of the airfoil. Additionally, the rate of heat transfer from the airfoil walls in specific regions of the serpentine passage can be tailored by the introduction of coolant through the secondary inlet. The additional pressure gained by enlarging the secondary inlet tends to backpressure the upstream legs of the serpentine passage, thereby reducing coolant velocity and heat transfer to the coolant in those regions. This provides for a lower coolant temperature as it mixes with the secondary inlet air and more capacity for cooling the trailing edge.

These and other objects, and advantages of the present invention will become more apparent in light of the following detailed description of a best mode thereof as illustrated in the accompanying drawings.

BRIEF DESCRIPTION OF THE DRAWING

FIG. 3 is a front, cross-sectioned view of the vane as shown in FIG. 2 according to the present invention; and FIG. 4 is a top cross-sectioned view of the vane as shown in FIG. 2.

BEST MODE FOR CARRYING OUT THE INVENTION

Figure 1:
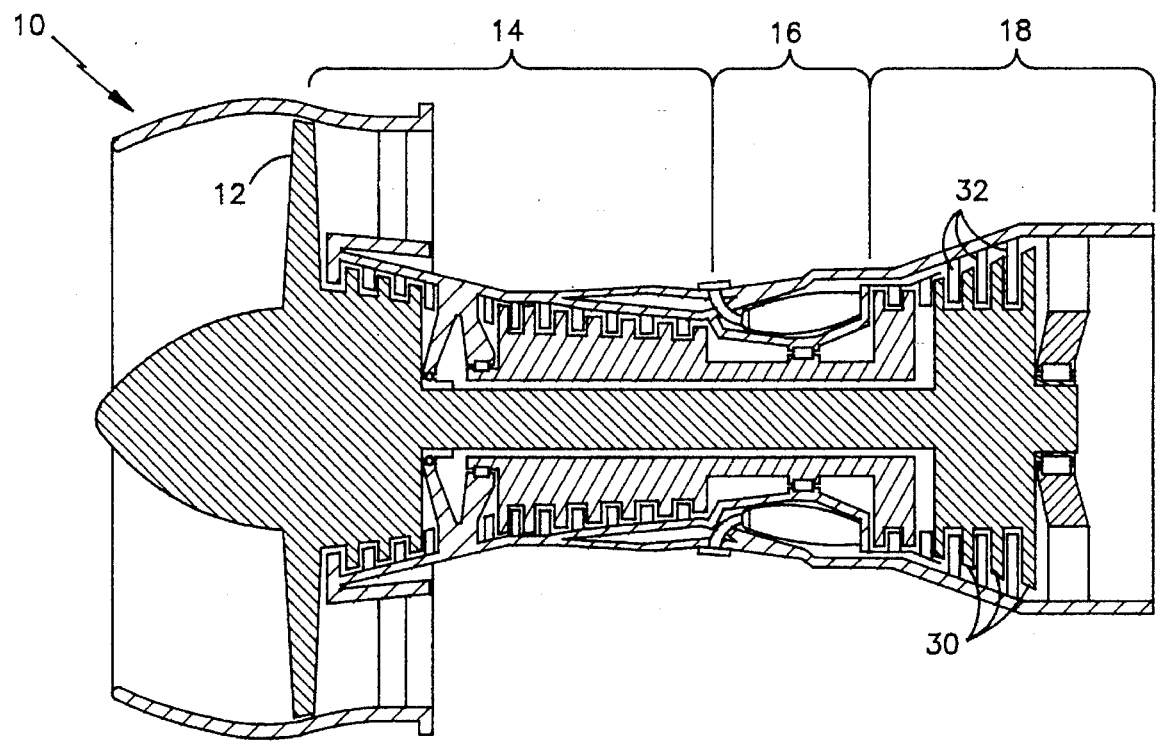
FIG. 1 is a simplified cross-sectioned view of a gas turbine engine of the type employing the turbine airfoils of the present invention.
Figure 2:
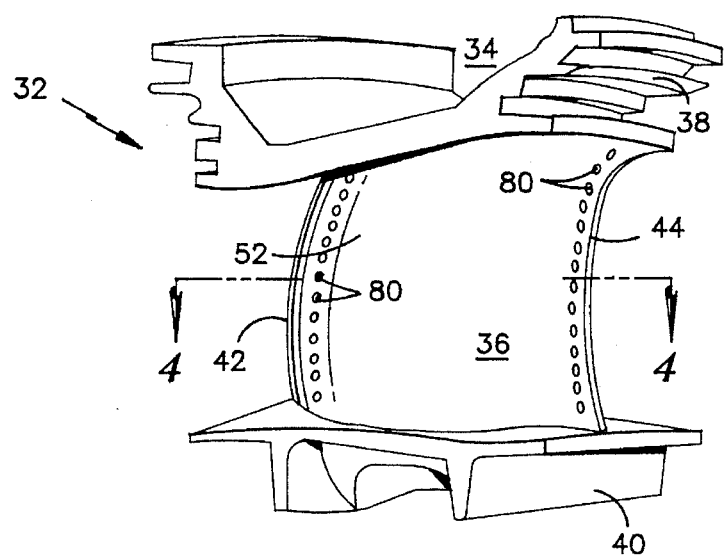
FIG. 2 is a top perspective view of a turbine vane shown in FIG. 1 according to the present invention.

FIG. 1 is a schematic representation of a turbofan gas turbine engine 10 used to propel aircraft. The engine 10 includes a fan 12, a compressor 14, a combustion section 16, and a turbine 18. As is well known in the art, air compressed in compressor 14 is mixed with fuel which is burned in combustor section 16 and expanded in turbine 18 the rotor of which, in response to the expansion, rotates, driving the compressor and fan. The turbine section 18 comprises alternating rows of rotary airfoils or blades 30 and static airfoils or vanes 32, as depicted in FIG. 2. A cavity plenum 34, as shown in FIG. 3, maintains a source of constant air pressure that is higher than the air is bled from the compressor section 14, bypassing combustor section 16.

Vane 32 comprises an airfoil portion 36 bounded at radial inner and outer ends thereof, by end structures 38 and 40, end structure 38 defining at least in part, cavity plenum 34. The airfoil portion 36 has a leading edge 42 and a trailing edge 44. A serpentine shaped cooling passage 50 is formed within the airfoil portion 36, bounded by outer, airfoil walls 52 and include primary and secondary inlets 54 and 56 respectively, both formed in the first end portion 38 of the airfoil 32 and opening into the plenum 34. As illustrated, primary inlet 54 is located at an upstream end of passage 50 and secondary inlet 56 at a medial portion thereof. Serpentine passage 50 winds around within the airfoil portion 36 and comprises parallel sections 60–64, extending in a spanwise direction, sections 60 and 61 being defined in part by passage walls 65 and turning vanes 68–70 which facilitate movement of the air flow through the passage 50. Serpentine passage 50 further includes raised fins or ridges (trip strips) 72 disposed on the inside surface of the airfoil wall 52. There are three types of ribs disposed in the trailing edge 44 of the airfoil—teardrop ribs 74, impingement ribs 76 and axial ribs 78 provided to tailor the flow through the airfoil for optimal cooling thereof. A plurality of film holes 80 are disposed within the airfoil walls 52 at the leading edge 42 and the trailing edge 44 thereof.

The cooling process is effectuated by compressor discharge air bypassing combustor 16, being channeled into plenum 34 by suitable passages (not shown) through the engine and flowing into serpentine passage 50 through primary inlet 54. The cooling air flow follows passage 50 through sections 60–64, being guided by the passage walls 65 and turning vanes 68–70. The cooling air passes over the trip strips 72 reducing the temperature of the airfoil walls 52. The cooling air also enters the serpentine passage 50 through secondary inlet 56 due to the pressure difference between the interior and exterior of the airfoil portion of the vane, the pressure of the air in the plenum 34 being higher than the pressure of the air in the passage section 62 due to the pressure drop experienced by the cooling air flow passing through the passage sections 60 and 61. As the cooling air enters the passage section 62 through the secondary inlet 56, it adds to the flow of cooling air in the airfoil, enhancing the overall flow toward the trailing edge 44 of the airfoil and therefor, the cooling of the trailing edge. Selective angling of secondary inlet 56, may also render vane 70 unnecessary, thereby reducing the necessary weight of the airfoil 32 and therefor of the engine itself.

Additional cooling air pressure afforded by the additional flow through secondary inlet 56 ensures that the pressure of the air flow at the trailing edge 44 exceeds the ambient pressure external of the airfoil. If the internal pressure does not exceed the external pressure, the external hot gases would seep through the film holes 80 into the airfoil, thereby burning the inside thereof. Thus, the air flow through the secondary inlet 56 increases the internal pressure at the trailing edge 44 assuring one way flow out of the airfoil.

The size of the secondary inlet 56 can be varied depending on the cooling requirements of the airfoil 32. If burning occurs in the trailing edge 44, the aperture 56 can be enlarged by drilling to accommodate increased flow. If passage sections 60 and 61 of the serpentine passage 50 tend to overheat, then by closing or partially closing 56, the velocity in areas 60 and 61 is increased, thereby increasing the cooling taking place therein. Secondary outlet 56 is conveniently formed as a result of casting around a core support rod which protrudes through the airfoil walls 52 when the airfoil is cast. The size of the aperture 56 can be initially governed by the size of the rod.

Vane 32 is also cooled by impingement cooling wherein a leading edge passage 90 includes cooling air inlet 92 formed within end structure 38 and communicating with the plenum 34, and an outlet 94 formed within end structure 40. The leading edge passage 90 includes cast crossover holes 96 formed in a leading edge passage wall 98. As cooling air enters the leading edge passage 90 through inlet 92 due to the pressure difference between the interior and exterior of the airfoil, it is directed onto the interior of the leading edge portion of wall 52 through the cast cross over holes 96, thereby cooling that portion of the wall, and then into the leading edge exhaust passage 100. The air exits exhaust passage 100 through the film holes 80 in the leading edge. The cooling air also exits the leading edge passage 90 through the exit 94, thereby furnishing a supply of cool air to the opposite end of vane 32.

While the present invention has been illustrated and described with respect to a particular preferred embodiment thereof, it should be appreciated by those of ordinary skill in the art, that various modifications of this invention may be made without departing therefrom and it is intended by the following claims to cover all such modifications as fall within the true spirit and scope of this invention.

I claim:

1. A method of fabricating a gas turbine engine airfoil with a serpentine internal cooling air passage having an upstream portion, a downstream portion and a medial portion therebetween and a primary cooling air inlet communicating with said serpentine passage at said upstream portion, said method comprising the steps of:

casting said airfoil around a core supported by a core support rod, said core having the shape of said internal passage with said primary cooling air inlet, and around said core support rod protruding through said airfoil;

removing said core and said core support rod from within said airfoil; and maintaining an opening formed as a result of removing said core support rod from protruding through said airfoil to allow cooling air to enter said passage at said medial portion of said passage.

2. The method of claim 1 further comprising the steps of:

optimizing cooling air circulating within said airfoil by varying the size of said opening after said airfoil is cast.

3. The method of claim 2 further comprising the steps of:

drilling said opening to increase the amount of cooling air passing through said opening.

4. The method of claim 2 further comprising the steps of:

partially filling said opening to decrease the amount of cooling air passing through said opening.

* * * * *